United States Patent [19]

Hosaka

[11] 4,335,183
[45] Jun. 15, 1982

[54] MAGNETIC RECORDING MEDIUM AND METHOD OF FABRICATING IT

[75] Inventor: Hiroshi Hosaka, Tokyo, Japan

[73] Assignee: Tokyo Magnetic Printing Co., Ltd., Japan

[21] Appl. No.: 257,944

[22] Filed: Apr. 27, 1981

[51] Int. Cl.³ ............................................. B05D 3/06
[52] U.S. Cl. .................................... 428/336; 427/44; 427/54.1; 427/128; 427/130; 428/537; 428/694; 428/900
[58] Field of Search ............... 428/336, 537, 694, 900; 427/44, 54.1, 128, 130

[56] References Cited

U.S. PATENT DOCUMENTS 3,104,983  9/1963  Tarwater et al. .................... 427/36

FOREIGN PATENT DOCUMENTS 47-12423  4/1972  Japan .

*Primary Examiner*—Bernard D. Pianalto
*Attorney, Agent, or Firm*—Kerkam, Stowell, Kondracki & Clarke

[57] ABSTRACT

A magnetic recording medium comprises a substrate of paper sheet and a magnetic recording layer applied to the substrate, which layer contains a magnetic material and an ultraviolet- or an electron beam-curing binder resin.

8 Claims, 3 Drawing Figures

MAGNETIC RECORDING MEDIUM AND METHOD OF FABRICATING IT

BACKGROUND OF THE INVENTION

1. Field of the Invention

This invention relates to a magnetic recording medium comprising a substrate of paper sheet and a method of fabricating it.

2. Description of the Prior Art

Magnetic recording mediums the substrate of which is made of paper sheet have been widely used for tickets for use in automatic ticket gates in railway stations, magnetic sheets (Ricoh, "MY TEACHER", Sonny "TALKING CARD", etc.) for use in teaching machines, because of their mass-productivites and low costs.

Conventional methods of forming a magnetic recording layer on a substrate of paper sheet are enumerated as follows:

(1) a method wherein an organic solvent type or water paint is applied to a substrate of paper sheet;

(2) a method wherein a magnetic tape comprising a plastic base is adhesively put on a substrate of paper sheet; and (3) a method wherein a magnetic film is applied to a plastic base and then the magnetic film is transferred from the plastic base to a substrate of paper sheet.

The method of the above items (2) and (3) have the advantage that a uniform magnetic film can be provided. However, these methods have the disadvantage that the fabricating costs are comparatively expensive, because they require the intermediate step of making a magnetic tape or the like, as compared with the method of the above item (1).

The method of the above item (1) is extensively used, but it has the essentially unavoidable disadvantage as described below.

According to the method of the above item (1), a magnetic paint containing a solvent is applied and dried to a substrate of paper sheet to form a magnetic film on the substrate. The magnetic film thus formed has a large internal stress. The magnetic film together with the substrate of paper tends to be deformed, for example be curved due to the large internal stress. Since the internal stree of the applied film is primarily caused in course of vaporization of organic solvent or water contained in the paint, this an inevitable problem in case of solvent being used as in the method of the above item (1).

This problem is not important in case of a plastic substrate being used, because the plastic substrate is thermoplastic and therefore even if a deformation is caused, it could easily be eliminated by heating or pressing. However, in case of a paper sheet substrate being used, if a deformation is once caused in the paper sheet substrate, it would be very difficult to eliminate such deformation.

Therefore, an object of this invention is to solve the above-mentioned problems in the prior art and provide a cheap and deformation-free magnetic recording medium using a paper sheet as a substrate.

Another object of this invention is to provide a method of fabricating a cheap and deformation-free magnetic recording medium with a good work efficiency.

SUMMARY OF THE INVENTION

According to an aspect of this invention, there is provided a magnetic recording medium comprising a substrate of paper sheet and a magnetic recording layer applied to the substrate, which layer contains a magnetic material and an ultraviolet- or an electron beam-curing binder resin.

According to another aspect of this invention, there is provided a method of fabricating a magnetic recording medium comprising the steps of preparing a substrate of paper sheet, applying to the substrate a magnetic paint containing a magnetic material and an ultraviolet- or an electron beam-curing binder resin, and irradiating the applied paint film with ultraviolet rays or electron beam to cause the paint film to cure and to thereby form a magnetic film.

DESCRIPTION OF THE PREFERRED EMBODIMENTS

As a preliminary explanation, the relationships between the degree of deformation such as curve or warp in a magnetic recording medium and the recording reproducing characteristics of the magnetic recording medium will be described.

Figure 1:
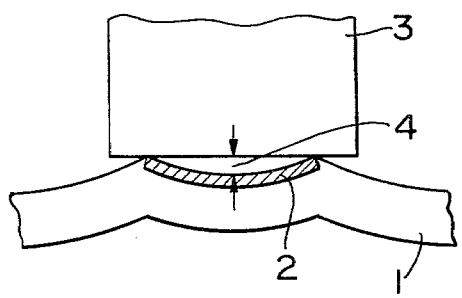
FIG. 1 is a schematic diagram illustrating the relationship of a magnetic head with a magnetic recording medium as fabricated according to a conventional method.

If a magnetic film is deformed, for example, curved or warped, a magnetic head could not uniformly contact the magnetic film, thereby resulting in a malfunction in reproducing. More specifically, as shown in FIG. 1, with a magnetic film 2 applied on only a portion of a substrate 1, the substrate 1 is locally deformed. When a magnetic head 3 is put on the magnetic film 2 of such substrate, there will be an air gap 4 between the face of the magnetic head 3 and the curved surface of the magnetic film 2. This will make it difficult to attain a uniform contact between the magnetic head and the magnetic film.

Figure 2:
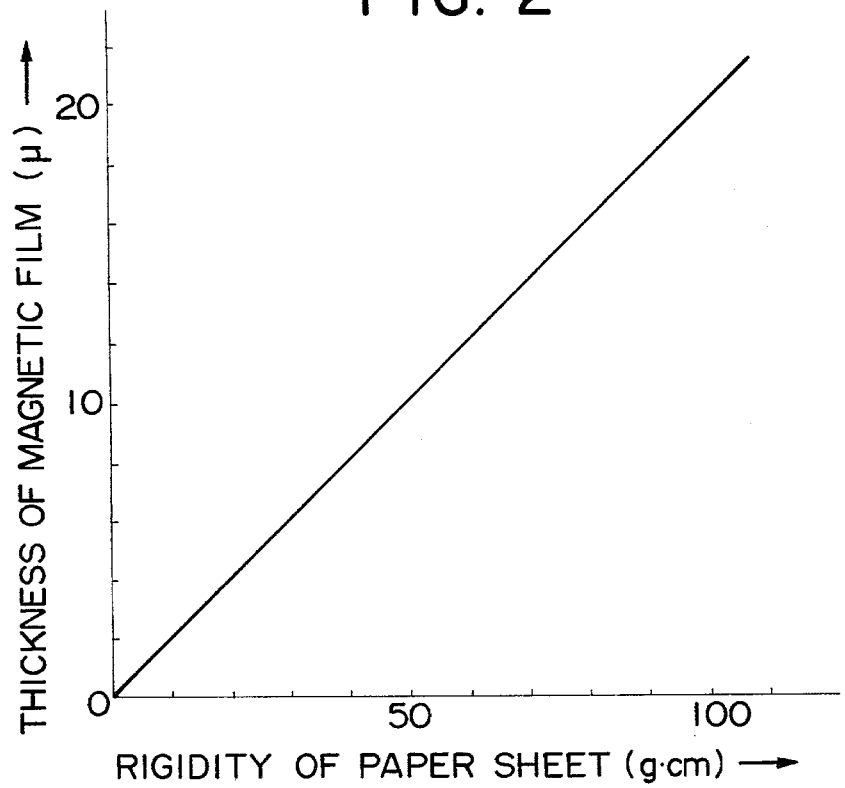
FIG. 2 is a graph showing a relationship between the rigidities of the paper sheets of the substrates and the thicknesses of the magnetic films applied to the substrates in magnetic recording mediums as made according to a conventional method, with the degress of resulting deformations being limited to a predetermined constant level.

The degree of such deformation is correlated with the thickness of magnetic film applied to a substrate and the rigidity of paper sheet of the substrate. Namely, the larger the thickness of magnetic film is, the larger the degree of deformation is. The lower the rigidity of paper sheet is, the larger the degree of deformation is. FIG. 2 shows the results of an experiment concerning such correlation, which experiment was conducted as follows:

A magnetic paint was prepared which consists of MRM 400 (commercially available from Toda Kogyo K.K.) of 30% as a magnetic material, vinyl chloride VAGH (commercially available from UVV Company) of 10% and urethane resin CA 250 (commercially available from Morton Chemical) of 5% as a binder and MEK/toluene (1/1) of 55% as a solvent. According to the method of the above item (1), the magnetic paint was applied to various substrates of paper by means of a nozzle coater and then dried for one minute at 100° C. to provide various magnetic films which are 10 mm wide. Then, the relationships between the thicknesses of the magnetic films 2 and the rigidities of the paper sheets of the substrates 1 wherein the air gap 4 as shown in FIG. 1 is $50\mu$ were examined. In the graph of FIG. 2, the rigidities (g.cm) of paper sheets are plotted along the abscissa and the thicknesses ($\mu$) of the magnetic films are plotted along the ordinate.

As seen from the graph of FIG. 2, if a magnetic film is formed on a substrate of paper sheet according to the method of the above item (1), an undesirable deformation occurs in the surface of the magnetic film, thereby resulting in failure to attain a uniform contact of a magnetic head with the magnetic film. Such deformation can be eliminated to some extent by increasing the contacting pressure between the magnetic head and the magnetic recording medium. However, this is not desirable because the increased head pressure leads to severe wear of the contacting face of the magnetic head.

To avoid such deformation, in magnetic recording mediums, a substrate having a large rigidity which cannot be deformed by the internal stress of the magnetic film to be applied to the substrate is generally used (For example, a magnetic credit card utilizes a substrate of vinyl chloride having a thickness of 0.7 mm). Alternatively, a substrate having a very small rigidity in which a deformation can be easily eliminated so as to attain a uniform contact by a magnetic head even if the deformation is produced in the substrate is used (as in a magnetic tape).

As another conventional measure for preventing any generation of internal stress in an applied film, a liquid epoxide or urethane resin containing a curing agent as an additive is used as a binder resin for a paint to form the film. Since the paint does not contain any vaporable component, the internal stress produced in forming an applied film of the paint is small so as to cause no appreciable deformation. However, since the paint contains the curing agent, the pot-life (the period of time for which the paint is usable) is short, so that the working efficiency of the process may be very low.

In view of these prior arts, this invention intends to avoid the use of a substrate having an excessively large rigidity as well as the use of a substrate having an excessively low rigidity and to provide a magnetic recording medium utilizing a substrate of paper sheet having a rigidity suitable for convenience in handling which can be fabricated with a good working efficiency.

An embodiment of this invention will be described.

A magnetic paint is prepared which consists of MRM 400 (commercially available from Toda Kogyo) of 70% as a magnetic material and Spilacqu T502X-4 (commercially available from Showa Kobunshi K.K.) of 30% as an ultraviolet-curing binder resin. The magnetic paint is applied to various substrates of paper sheets by means of a nozzle coater to provide various applied films which are 10 mm wide. The applied films are then cured to form magnetic films by irradiating the applied paint films with ultraviolet rays for two seconds by means of a high pressure mercury-arc lamp of 80 w/cm which is located 15 cm distant from the applied films. It has been found that all of the resulting magnetic films have an entirely flat surface. For example, even a magnetic film having a thickness of $15\mu$ which was applied to a substrate of paper sheet having a rigidity of 20 g.cm had a completely flat surface.

Figure 3:
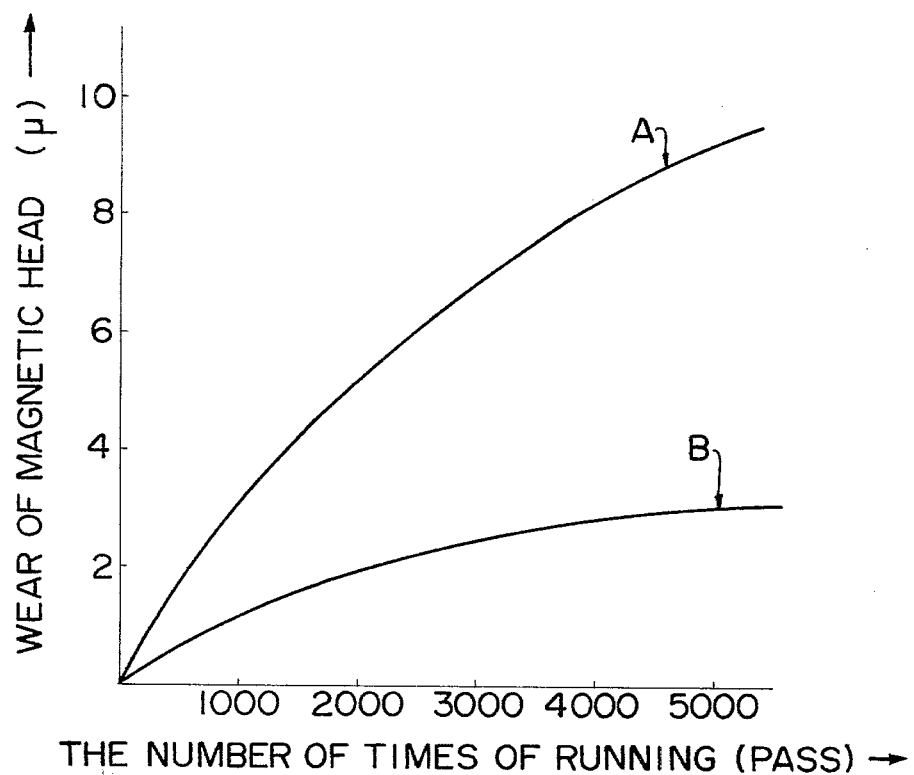
FIG. 3 is a graph showing wear characteristics of a magnetic head as plotted with respect to the number of times of running for a magnetic recording medium made according to a conventional method and a magnetic recording medium made according to this invention respectively.

To compare a magnetic recording medium according to this embodiment of this invention with a magnetic recording medium comprising a substrate of paper sheet having a rigidity of 20 g.cm and a magnetic film having a thickness of $5\mu$ applied to the substrate among those made according to the conventional method described above in connection with FIG. 2, with respect to their electromagnetic characteristics, the following experiments were conducted. These magnetic recording medium were read out by means of a card reader comprising a magnetic head utilizing a permalloy core (which reader is a modified one of MCT 150 commercially available from Sankyo Seiki Mfg. Co., Ltd.). With the magnetic recording medium according to the conventional method, a magnetic head pressure of 30 g was required to obtain a stable output because the magnetic film has a deformation of about $50\mu$, as noted from FIG. 2. On the contrary, with the magnetic recording medium according to this invention, a magnetic head pressure of 10 g was sufficient to obtain a uniform output because the medium has no deformation. Magnetic head pressure has a significant influence on the durability of magnetic recording medium and wear of magnetic head. In either case, it is preferable that the magnetic head pressure is as low as possible. In this experiment, the durabilities of the magnetic recording mediums were not compared with each other because the durabilities may be widely changed due to the differences between the compositions of the magnetic films of both mediums. Instead, the degrees of magnetic head wears by both mediums were measured and compared with each other. The results are shown in the graph of FIG. 3. In FIG. 3, curve A indicates a relationship between the wear of magnetic head and the number of times of running passes of the magnetic recording medium according to the conventional method through the magnetic head, while curve B indicate a similar relationship for the magnetic recording medium of this invention. In this case, the magnetic head pressure was 30 g for the magnetic recording medium made according to the conventional method, but 10 g for the magnetic recording medium of this invention. As will be apparent from the comparison of the curve A with the curve B, the magnetic recording medium of this invention caused only a small degree of magnetic head wear which is about one third of that in the conventional magnetic recording medium. For the durability of magnetic recording medium, it is natural that a low magnetic head pressure is preferable.

As another embodiment of this invention, substituting an electron beam-curing binder resin (for example, Uvithane 788 (commercially available from Thiokol in U.S.A.) for the ultraviolet-curing binder resin in the above embodiment and using electron beam irradiation in place of ultraviolet irradiation, an experiment similar to that conducted in the above embodiment was carried out. The resulting magnetic films had completely flat surfaces. It has been found that similar good results can be obtained.

From the above, it will be apparent that according to this invention, a magnetic recording medium comprising a substrate of paper sheet can be provided which is cheap, mass-producible and highly durable and causes only a small degree of magnetic head wear.

Incidentally, the thicknesses of magnetic films which are generally used are in the range of 0.5μ to 20μ. With the thicknesses of magnetic films in this range, if a substrate of paper sheet having a rigidity larger than 100 g.cm is used, no large deformation will be produced in the resulting magnetic recording film even in the conventional method. Therefore, it can be said that this invention exhibits an outstanding advantage particularly when it is applied to magnetic recording mediums comprising a substrate of paper sheet having a rigidity of 2 to 100 g.cm and a magnetic film having a thickness of 0.5 to 20μ.

I claim:

1. A magnetic recording medium comprising a substrate of paper sheet and a magnetic recording layer applied to said substrate, said layer containing a magnetic material and an ultraviolet-curing binder resin.

2. A magnetic recording medium as defined in claim 1 wherein said paper sheet has a rigidity of 2 to 100 g.cm, and said layer has a thickness of 0.5 to 20μ.

3. A magnetic recording medium comprising a substrate of paper sheet and a magnetic recording layer applied to said substrate, said layer containing a magnetic material and an electron beam curing binder resin.

4. A magnetic recording medium as defined in claim 3 wherein said paper sheet has a rigidity of 2 to 100 g.cm and said layer has a thickness of 0.5 to 20μ.

5. A method of fabricating a magnetic recording medium comprising the steps of preparing a substrate of paper sheet, applying to said substrate a magnetic paint containing a magnetic material and an ultraviolet-curing binder resin, and irradiating said applied paint film with ultraviolet rays to cause said paint film to cure and to thereby form a magnetic film.

6. A method as defined in claim 5 wherein said paper sheet has a rigidity of 2 to 100 g.cm and said layer has a thickness of 0.5 to 20μ.

7. A method of fabricating a magnetic recording medium comprising the steps of preparing a substrate of paper sheet, applying to said substrate a magnetic paint containing a magnetic material and an electron beam-curing binder resin, and irradiating said applied paint film with electron beam to cause said paint film to cure and to thereby form a magnetic film.

8. A method as defined in claim 7 wherein said paper sheet has a rigidity of 2 to 100 g.cm and said layer has a thickness of 0.5 to 20μ.

* * * * *

UNITED STATES PATENT AND TRADEMARK OFFICE
CERTIFICATE OF CORRECTION

PATENT NO. : 4,335,183
DATED : March 23, 1982
INVENTOR(S) : Hiroshi Hosaka

It is certified that error appears in the above–identified patent and that said Letters Patent are hereby corrected as shown below:

Cover Page, insert headnote

"[30] Foreign Application Priority Data
May 12, 1980 [JP] Japan ......62641"

Signed and Sealed this

Seventeenth Day of August 1982

[SEAL]

Attest:

Attesting Officer

GERALD J. MOSSINGHOFF
Commissioner of Patents and Trademarks